United States Patent
Egawa et al.

(10) Patent No.: US 7,540,974 B2
(45) Date of Patent: Jun. 2, 2009

(54) ANTIFREEZE/COOLANT COMPOSITION

(75) Inventors: Hiroshi Egawa, Gifu (JP); Michihiro Hori, Gifu (JP); Hidemi Kado, Gifu (JP); Yoshiyuki Morita, Saitama (JP); Mitsuru Osawa, Saitama (JP); Ayako Omori, Saitama (JP)

(73) Assignees: Honda R&D Co, Ltd., Saitama (JP); Shishiai-Kabushikigaisha, Gifu (JP)

( * ) Notice: Subject to any disclaimer, the term of this patent is extended or adjusted under 35 U.S.C. 154(b) by 0 days.

(21) Appl. No.: 11/789,726

(22) Filed: Apr. 25, 2007

(65) Prior Publication Data

US 2008/0035880 A1 Feb. 14, 2008

Related U.S. Application Data

(63) Continuation-in-part of application No. PCT/JP2004/015780, filed on Oct. 25, 2004.

(51) Int. Cl.
C09K 5/08 (2006.01)
C09K 5/00 (2006.01)
C09K 5/10 (2006.01)
C09K 5/20 (2006.01)

(52) U.S. Cl. ............... 252/71; 252/70; 252/73; 252/74

(58) Field of Classification Search ............ 252/70, 252/71, 72, 73, 74, 75, 76, 77, 78.1, 79
See application file for complete search history.

(56) References Cited

U.S. PATENT DOCUMENTS

| | | | |
|---|---|---|---|
| 3,362,910 A | | 1/1968 | Hermann et al. |
| 4,404,113 A | | 9/1983 | Peters et al. |
| 4,418,231 A | | 11/1983 | Pamer |
| 4,647,392 A | | 3/1987 | Darden et al. |
| 4,689,165 A | | 8/1987 | Kardos et al. |
| 4,740,869 A | | 4/1988 | Morimoto et al. |
| 4,851,145 A | | 7/1989 | Van Neste et al. |
| 5,080,818 A | * | 1/1992 | Tachiiwa et al. ............ 252/75 |
| 5,364,549 A | | 11/1994 | McDonogh |
| 5,417,819 A | * | 5/1995 | Askin et al. ................ 428/687 |
| 6,280,651 B1 | * | 8/2001 | Wojtczak et al. ........... 252/79.1 |
| 6,284,721 B1 | * | 9/2001 | Lee ........................... 510/175 |
| 6,398,984 B1 | | 6/2002 | Maes et al. |
| 6,508,951 B1 | * | 1/2003 | Mori et al. ................. 252/73 |
| 6,676,848 B2 | | 1/2004 | Maes et al. |
| 6,818,147 B2 | | 11/2004 | Wenderoth et al. |
| 6,881,355 B2 | * | 4/2005 | Hafner et al. ............... 252/73 |
| 2002/0053655 A1 | | 5/2002 | Maes et al. |
| 2003/0164470 A1 | | 9/2003 | Wenderoth et al. |
| 2004/0026656 A1 | | 2/2004 | Hafner et al. |
| 2004/0119044 A1 | | 6/2004 | Wenderoth et al. |
| 2006/0131277 A1 | * | 6/2006 | Epton et al. ................ 216/102 |

FOREIGN PATENT DOCUMENTS

| | | | |
|---|---|---|---|
| EP | 0048429 | | 3/1982 |
| EP | 0251480 | | 5/1987 |
| EP | 0229254 | | 7/1987 |
| EP | 0457859 | | 11/1991 |
| EP | 0864627 | | 9/1998 |
| EP | 0995785 | | 4/2000 |
| EP | 1133585 | | 9/2001 |
| EP | 1386952 | | 2/2004 |
| JP | 63-191882 A | * | 8/1988 |
| JP | 04117481 | | 4/1992 |
| JP | 08085782 | | 4/1996 |
| JP | 2002527619 | | 8/2002 |
| JP | 2004506091 | | 2/2004 |
| JP | 2004068155 | | 3/2004 |
| JP | 2004-143473 A | * | 5/2004 |
| JP | 2004143473 | | 5/2004 |
| JP | 2004530017 | | 9/2004 |
| SU | 1563936 A | * | 5/1990 |
| WO | WO8600917 | | 2/1986 |
| WO | WO0022189 | | 4/2000 |
| WO | WO0208354 | | 1/2002 |
| WO | WO02090462 | | 11/2002 |
| WO | WO2004/085566 | | 10/2004 |

OTHER PUBLICATIONS

Wickberg, Anders, *Magnesium in the Volvo LCP 2000*, SAE Technical Paper Series, pp. 1-12, Dated Feb. 25-Mar. 1, 1985.

* cited by examiner

*Primary Examiner*—Anthony J Green
(74) *Attorney, Agent, or Firm*—Patterson, Thuente, Skaar & Christensen, P.A.

(57) ABSTRACT

An antifreeze/coolant composition, comprising a) a base material such as water, alcohol, glycol and glycol ether; b) a fluorine compound and c) an inorganic acid.

9 Claims, No Drawings

ANTIFREEZE/COOLANT COMPOSITION

CROSS REFERENCE TO RELATED PATENT APPLICATION

This application is a continuation-in-part of copending international patent application PCT/JP2004/015780 entitled "Antifreeze/Coolant Composition" filed Oct. 25, 2004, the disclosure of which is hereby incorporated herein by reference.

TECHNICAL FIELD

The present invention relates to an antifreeze/coolant composition for use in cooling systems for internal combustion engines such as car engines, and in particular to an antifreeze/coolant composition which effectively prevents corrosion of magnesium or magnesium alloy parts used in cooling systems.

BACKGROUND ART

Metals such as aluminum, aluminum alloys, cast iron, steel, brass, solder and copper are used in cooling systems for internal combustion engines such as car engines. These metals can corrode by contacting water or air. Therefore, antifreeze/coolant compositions for use in cooling systems contain a metal corrosion inhibitor to prevent corrosion of such metals.

In recent years, automobiles are becoming lighter in order to conserve natural resources and energy. Because of this trend, materials used in cooling systems for car engines are also becoming lighter. Magnesium and magnesium alloys which are lighter than most other popularly used metals and excellent in terms of recyclability have come into the spotlight.

Magnesium and magnesium alloys have lower standard electrode potentials than most other popularly used metals. Therefore, it was difficult to effectively prevent corrosion of such metals when used in a solution.

In recent years, compositions containing a compound which effectively prevents corrosion of magnesium and magnesium alloys have been proposed. Fluorides, for example, are known as rust inhibitors for magnesium (see Non-Patent Document 1).

In Patent Document 1, a coolant composition is proposed where carboxylic acid is added together with a fluoride or a fluorocarboxylic acid (see Patent Document 1).

In addition, a coolant composition where amide carboxylate or amide sulfonate is used to prevent corrosion of magnesium and magnesium alloys has also been proposed (see Patent Document 2).

Although such coolant compositions including these compounds are effective of reducing corrosion of magnesium, the corrosion prevention effect is insufficient for coolant compositions for engine cooling systems and therefore, a composition having a greater effect in preventing corrosion is in demand.

Non-Patent Document 1: SAE Technical Paper Series 850418
Patent Document 1: International Unexamined Patent Publication 2002-527619
Patent Document 2: International Unexamined Patent Publication 2004-506091

DISCLOSURE OF THE INVENTION

Problem to Be Solved by the Invention
The present inventors conducted a diligent research to develop an antifreeze/coolant composition which provides sufficient corrosion prevention in an engine cooling system and the like comprising of magnesium or a magnesium alloy, and discovered that combinations of fluorine compounds and inorganic acids are highly effective for preventing corrosion of magnesium and magnesium alloys.

Accordingly, an object of the present invention is to provide an antifreeze/coolant composition which can effectively prevent corrosion of magnesium or magnesium alloy of a cooling system.

Means for Solving Problem

In order to achieve the above object, the present invention provides an antifreeze/coolant composition comprised of a mixture of a base material selected from water, alcohol, glycol and glycol ether and a fluorine compound and an inorganic acid.

The antifreeze/coolant composition according to the present invention provides a function of effectively preventing corrosion of magnesium and/or magnesium alloys for a cooling system. The base material of this composition is one or more materials selected from among water, alcohol, glycol and glycol ether.

Such alcohol may be methanol, ethanol, propanol, butanol, pentanol, hexanol, heptanol or octanol.

Such glycol may be ethylene glycol, diethylene glycol, triethylene glycol, propylene glycol, 1,3-propanediol, 1,3-butanediol, 1,5-pentanediol and hexylene glycol.

Such glycol ether may be ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether or tetraethylene glycol monobutyl ether.

The antifreeze/coolant composition according to the present invention is characterized by containing both a fluorine compound and an inorganic acid in the base material. A fluorine compound collaborates with an inorganic acid to effectively prevent corrosion of magnesium or magnesium alloys of cooling systems. Such fluorine compound may be hydrogen fluoride, potassium fluoride, sodium fluoride, ammonium fluoride, lithium fluoride, sodium fluorocarboxylate or potassium fluorocarboxylate. Among these, fluorides selected from among hydrogen fluoride, potassium fluoride, sodium fluoride and ammonium fluoride are particularly preferable for their excellent corrosion preventive effects on magnesium or magnesium alloys.

Such fluorine compound is preferably contained from 0.01 mass % to 5.0 mass %. In the case where a fluorine compound is contained below this range, corrosion prevention of magnesium and magnesium alloys will be insufficient while in the case where a fluorine compound is contained above this range, no additional effects can be expected, which is uneconomical.

An inorganic acid and a fluorine compound collaborate and effectively prevent corrosion of magnesium or magnesium alloys of cooling systems. Such inorganic acid may be phosphoric acid, silicic acid, boric acid, nitric acid, nitrous acid, molybdic acid, carbonic acid, sulfuric acid, titanic acid, vanadic acid, manganic acid, germanic acid, tungstic acid or their salts. When such an acid or acids are included, corrosion of magnesium or magnesium alloys is excellently prevented.

Of these inorganic acids, such phosphoric acid may be orthophosphoric acid, pyrophosphoric acid, trimetaphosphoric acid or tetrametaphosphoric acid. Such silicic acid may be sodium metasilicate, potassium metasilicate and sodium silicate ($Na_2O/XSiO_2$ X is 0.5 to 3.3).

Such salts of boric acid, nitric acid, nitrous acid, molybdic acid, carbonic acid, sulfuric acid, titanic acid, vanadic acid, manganic acid, germanic acid or tungstic acid may be sodium salts, potassium salts or ammonium salts.

Among such inorganic acids, phosphoric acid and/or a salt thereof, silicic acid and/or a salt thereof, and a combination of two or more selected from among phosphoric acid and salts thereof and silicic acid and salts thereof may be preferably used. Thus, a combination of phosphoric acid and silicic acid, a combination of phosphoric acid and a silicate, a combination of a phosphate and silicic acid, a combination of a phosphate and a silicate, a combination of phosphoric acid, silicic acid and a silicate, a combination of phosphoric acid, a phosphate and silicic acid, a combination of phosphoric acid, a phosphate and a silicate, a combination of a phosphate, a silicate and silicic acid, and a combination of phosphoric acid, a phosphate, silicic acid and a silicate may be effectively used.

Preferably, such inorganic acid is contained within the range from 0.01 mass % to 10.0 mass %. In the case where an inorganic acid is contained below this range only little effect of preventing corrosion of magnesium and magnesium alloys is expected, while in the case where an inorganic acid is contained above this range, no additional effects may be expected, thus, uneconomical.

In the case where phosphoric acid and/or a salt thereof is used as an inorganic acid, or in the case where silicic acid and/or a salt thereof is used, a fluorine compound is preferably contained within the range from 0.01 mass % to 5.0 mass % in the composition, and the phosphoric acid and/or salt thereof or silicic acid and/or salt thereof is contained within the range from 0.01 mass % to 5.0 mass %. The contents of the fluorine compound and the phosphoric acid and/or salt thereof or silicic acid and/or salt thereof should be such that sufficient effects of preventing corrosion of magnesium and magnesium alloys may be achieved, and use of a fluorine compound and a phosphoric acid and/or salt thereof or silicic acid and/or salt thereof should be economically determined.

In the case where a combination of phosphoric acid and/or a salt thereof and silicic acid and/or a salt thereof is used as the inorganic acid, preferably a fluorine compound is contained within the range from 0.01 mass % to 5.0 mass % in the composition, and a phosphoric acid and/or salt thereof and silicic acid and/or salt thereof is contained within the range from 0.01 mass % to 5.0 mass %. The content should be such that sufficient effects of preventing corrosion of magnesium and magnesium alloys may be achieved, and use of a fluorine compound and a phosphoric acid and/or salt thereof and silicic acid and/or salt thereof should be economically determined.

The antifreeze/coolant composition according to the present invention may further include one or more selected from among aromatic monobasic acids, aromatic dibasic acids, aliphatic monobasic acids, aliphatic dibasic acids and their salts.

Such aromatic monobasic acids and their salts may be benzoic acids, such as benzoic acid, nitrobenzoic acid and hydroxybenzoic acid, alkylbenzoic acids, such as p-toluic acid, p-ethylbenzoic acid, p-propylbenzoic acid, p-isopropylbenzoic acid and p-tert butylbenzoic acid, alkoxybenzoic acids ($RO-C_6H_4-COOH$:R is an alkyl group with C1 to C5), cinnamic acids ($R-C_6H_4-CH=COOH$:R is an alkyl group or an alkoxy group with C1 to C5), alkyl cinnamic acids or alkoxy cinnamic acids, or their alkaline metal salts, ammonium salts or amine salts. Benzoic acid, p-toluic acid and p-tert butylbenzoic acid are excellent in corrosion prevention for aluminum based and iron based metals, and therefore, it is desirable that at least one of these compounds is included.

Such aromatic dibasic acids and their salts may be phthalic acid, isophthalic acid or terephthalic acid or their alkaline metal salts and ammonium salts.

Preferably, such aromatic monobasic or aromatic dibasic acids are contained within the range from 0.1 mass % to 10 mass %. In the case where an aromatic monobasic or aromatic dibasic acid is contained less than 0.1 mass %, only little effects of preventing corrosion of aluminum based and iron based metals is expected, while in the case of more than 10 mass % is contained, no additional effects may be expected, which is uneconomical.

Such aliphatic monobasic acids and their salts may be, pentanoic acid, hexanoic acid, heptanoic acid, octanoic acid, 2-ethyl hexanoic acid, nonanoic acid, decanoic acid, undecanoic acid, dodecanoic acid, oleic acid, linoleic acid, linolenic acid, ricinoleic acid or stearic acid, or their alkaline metal salts and ammonium salts of these can be used.

Such aliphatic dibasic acids and their salts may be oxalic acid, malonic acid, succinic acid, glutaric acid, adipic acid, piperinic acid, suberic acid, azelaic acid, sebacic acid, undecanedioic acid, dodecanedioic acid, brassylic acid or taptic acid or their alkaline metal salts amine salts or ammonium salts. Among these, suberic acid, azelaic acid, sebacic acid, undecanediouic acid and dodecanedioic acid are preferred.

Preferably, such aliphatic monobasic acid, aliphatic dibasic acid or salt thereof is included within the range from 0.1 mass % to 10 mass %. In the case where such aliphatic monobasic acid, aliphatic dibasic acid or salt thereof is contained less than 0.1 mass %, only little effects of preventing corrosion of aluminum based and iron based metals is expected, while in the case where the content exceeds 10 mass %, no additional effects may be expected and thus uneconomical.

In addition, the antifreeze/coolant composition according to the present invention may include one or more selected from among triazoles and thiazoles. Benzotriazole, tolyltriazole, 4-phenyl-1,2,3-triazole, 2-naphtotriazole and 4-nitrobenzo triazole may be used as triazoles, and among these, benzotriazole and tolyltriazole are particularly preferred. In addition, benzothiazole and mercaptobenzothiazole may be used as thiazoles.

When these triazoles or thiazoles are added, the effects of preventing corrosion of copper based metals, such as brass and copper, will be improved. Preferably, a triazole is contained within the range from 0.01 mass % to 1.0 mass %. Preferably, such thiazole is contained within the range from 0.01 mass % to 1.0 mass %.

In addition, it is desirable that the antifreeze/coolant composition according to the present invention has a pH within the range from 9 to 13. In the case where the pH value is within the above described range, the effects of preventing corrosion of magnesium and magnesium alloys will further be improved.

The antifreeze/coolant composition according to the present invention may include a conventional antifoaming agent, coloring agent and/or conventional corrosion inhibitor in addition to the above described materials.

The present invention should not be limited by the following embodiments, and modifications within the scope of the appended claims are possible.

EFFECTS OF THE INVENTION

The antifreeze/coolant composition according to the present invention contains a base material comprising one or more selected from among water, alcohol, glycol and glycol ether as well as and contains a fluorine compound and an inorganic acid in such base material. The composition will effectively prevent corrosion of the magnesium or magnesium alloys of cooling systems.

BEST MODE FOR CARRYING OUT THE INVENTION

EMBODIMENTS

Embodiment 1 comprising potassium fluoride and a phosphate, Embodiment 2 comprising potassium fluoride and a silicate, and Embodiment 3 comprising potassium fluoride, a phosphate and a silicate were prepared (Table 1). In addition, Comparative 1 free of any rust inhibiting additive, Comparative 2 including only potassium fluoride, Comparative 3 including only a phosphate, and Comparative 4 including only a silicate were also prepared (Table 1). A metal corrosion test was conducted on the respective samples of the Embodiments 1 to 3 and Comparatives 1 to 4 to measure and evaluate changes in weight and appearance of test metal pieces. The results of the test are shown in Table 2. The metal corrosion test was performed according to the standard of JIS K 2234 (Metal Corrosiveness Property Test), and Mg alloy (AZ91D) was used as the test metal pieces.

Table 2 shows that Comparatives 1 to 4, which did not contain both or none of a fluorine compound and an inorganic acid, exhibited a large change in weight and showed inferior corrosion prevention for Mg alloy, while all of the samples of Embodiments 1 to 3, which contained both a fluorine compound and an inorganic acid, exhibited little change in weight and provided excellent corrosion prevention for Mg alloy.

INDUSTRIAL APPLICABILITY

The present invention provides an antifreeze/coolant composition for use in cooling systems of internal combustion engines such as car engines, and in particular, in cooling systems comprising magnesium or magnesium alloy parts.

We claim:

1. An antifreeze/coolant composition, consisting essentially of: a) at least one base material selected from the group consisting of water, alcohol, glycol and glycol ether; b) at least one fluorine compound selected from the group consisting of hydrogen fluoride, potassium fluoride, sodium fluoride, ammonium fluoride and lithium fluoride and c) at least one inorganic acid selected from the group consisting of vanadic acid, germanic acid and salts thereof.

2. The antifreeze/coolant composition according to claim 1, wherein the at least one fluorine compound is present at a level between 0.01 mass % and 5.0 mass % of the antifreeze/coolant composition and the at least one inorganic acid is present at a level between 0.01 mass % and 10.0 mass % of the antifreeze/coolant composition.

3. The antifreeze/coolant composition according to claim 1, further consisting essentially of a phosphoric acid or a salt thereof.

4. The antifreeze/coolant composition according to claim 3, wherein the at least one fluorine compound is present at a level between 0.01 mass % to 5.0 mass % of the antifreeze/coolant composition and the at least one inorganic acid is present at a level between 0.01 mass % to 5.0 mass % of the antifreeze/coolant composition.

5. The antifreeze/coolant composition according to claim 1, further consisting essentially of a silicic acid or a salt thereof.

6. The antifreeze/coolant composition according to claim 5, wherein the at least one fluorine compound is present at a level between 0.01 mass % and 5.0 mass % of the antifreeze/

TABLE 1

| Component | Embodiment 1 | Embodiment 2 | Embodiment 3 | Comparative 1 | Comparative 2 | Comparative 3 | Comparative 4 |
| --- | --- | --- | --- | --- | --- | --- | --- |
| Ethylene glycol | 100 | 100 | 100 | 100 | 100 | 100 | 100 |
| Potassium fluoride | 0.5 | 0.5 | 0.5 | — | 0.5 | — | — |
| Phosphate | 1.0 | — | 1.0 | — | — | 1.0 | — |
| Silicate | — | 1.0 | 1.0 | — | — | — | 1.0 |

TABLE 2

| Item | Embodiment 1 | Embodiment 2 | Embodiment 3 | Comparative 1 | Comparative 2 | Comparative 3 | Comparative 4 |
| --- | --- | --- | --- | --- | --- | --- | --- |
| change of test piece | Slight change in color | Slight change in color | Slight change in color | Color changed to black; corrosion on entire surface | Color changed to white; porous corrosion | Color changed to black; corrosion on entire surface | Color changed to black; corrosion on entire surface |
| change in mass mg/cm2 | +0.14 | +0.18 | +0.22 | +2.28 | +0.36 | +3.45 | +2.94 | coolant composition and the at least one inorganic acid is present at a level between 0.01 mass % and 5.0 mass % of the antifreeze/coolant composition.

7. The antifreeze/coolant composition according to claim 1, further consisting essentially of a phosphoric acid or a salt thereof and a silicic acid or a salt thereof.

8. The antifreeze/coolant composition according to claim 7, wherein the at least one fluorine compound is present at a level between 0.01 mass % and 5.0 mass % of the antifreeze/coolant composition, the phosphoric acid or salt thereof is present at a level between 0.01 mass % and 5.0 mass % of the antifreeze/coolant composition, and the silicic acid or salt thereof is present at a level between 0.01 mass % and 5.0 mass %.

9. The antifreeze/coolant composition according to claim 1 wherein the pH of the antifreeze/coolant composition is 9 to 13.

* * * * *